United States Patent [19]

Cummings, Jr. et al.

[11] 4,428,893
[45] Jan. 31, 1984

[54] PIPE SUPPORT

[75] Inventors: Paul W. Cummings, Jr., Worcester; David J. Mailhot, Rutland, both of Mass.

[73] Assignee: Norton Co., Worcester, Mass.

[21] Appl. No.: 469,329

[22] Filed: Feb. 24, 1983

Related U.S. Application Data

[63] Continuation-in-part of Ser. No. 421,207, Sep. 22, 1982, abandoned.

[51] Int. Cl.³ .............................................. B01F 3/04
[52] U.S. Cl. .................................... 261/122; 248/74 B
[58] Field of Search ............. 261/122; 248/74 B, 74 R

[56] References Cited

U.S. PATENT DOCUMENTS

| | | | |
|---|---|---|---|
| 1,075,356 | 10/1913 | Jones . | |
| 1,840,216 | 1/1932 | Tormo | 248/74 B |
| 2,141,032 | 12/1938 | Cordell | 248/74 R |
| 2,221,346 | 11/1940 | Durdin, Jr. | 261/122 |
| 2,386,629 | 10/1945 | North et al. | 248/74 B |
| 2,521,454 | 9/1950 | Dressler | 261/124 |
| 2,675,978 | 4/1954 | Brown | 248/65 |
| 2,826,385 | 3/1958 | Osborn | 248/74 B |
| 2,846,168 | 8/1958 | Schroeter | 248/49 |
| 3,043,545 | 7/1962 | Lindberg, Jr. | 248/49 |
| 3,232,569 | 2/1966 | Deardorf | 248/74 R |
| 3,288,406 | 11/1966 | Degen | 248/49 |
| 3,458,964 | 8/1969 | Guilliams | 52/365 |
| 3,493,204 | 2/1970 | Prouty | 248/49 |
| 3,554,474 | 1/1971 | Davies | 248/49 |
| 3,767,149 | 10/1973 | Hill | 248/49 |
| 3,802,676 | 4/1974 | Thayer | 261/122 |
| 3,848,639 | 11/1974 | Chen | 138/103 |
| 3,954,922 | 5/1976 | Walker et al. | 261/121 |

FOREIGN PATENT DOCUMENTS

| | | | |
|---|---|---|---|
| 283666 | 12/1966 | Australia | 248/74 R |
| 3047973 | 10/1981 | Fed. Rep. of Germany | 248/74 R |
| 712816 | 8/1954 | United Kingdom | 261/122 |
| 925912 | 5/1963 | United Kingdom | 248/74 R |
| 2062803 | 5/1981 | United Kingdom | 248/74 R |

*Primary Examiner*—Tim R. Miles
*Attorney, Agent, or Firm*—Arthur A. Loiselle, Jr.

[57] ABSTRACT

A saddle type pipe support means attachable to a base. The support is comprised of an inverted V-shaped member, a sling support located at the vertex of said inverted V-shaped member for engagement of a pipe to the support, and a clamping means for securing the pipe to the sling. The leg elements of the inverted V-shaped member include a foot on each element for engagement with and fastening to a floor or base.

4 Claims, 2 Drawing Figures

PIPE SUPPORT

CROSS-REFERENCE TO RELATED APPLICATION

This application is a continuation-in-part of application Ser. No. 06/421,207 filed Sep. 22, 1892, now abandoned.

TECHNICAL FIELD

This invention relates to support means for securing the piping, fittings and diffusers in a fixed horizontal plane above the floor of liquid treatment systems such as the aeration basin of a wastewater treatment system, ozonation of potable water, carbonation of liquids, fermentation processes and the like. More specifically it is concerned with an adjustable saddle structure means for supporting the aeration pipes in the basin.

BACKGROUND ART

1. Prior Art Statetment

The following patents are representative of the most relevant prior art known to the Applicants at the time of filing this application:

| U.S. Pat. Nos. | |
| --- | --- |
| 2,521,454 to Dressler | Sept. 5, 1950 |
| 3,802,676 to Thayer | Apr. 9, 1974 |
| 3,954,922 to Walker et al | May 7, 1976 | both show typical supports for aeration pipes in sewage treatment basins, and

| | |
| --- | --- |
| 1,075,356 to Jones | Oct. 14, 1913 |
| 2,675,978 to Brown | Apr. 20, 1954 |
| 2,846,168 to Schroeter | Aug. 5, 1958 |
| 3,043,545 to Lindberg, Jr. | July 10, 1962 |
| 3,288,406 to Degen | Nov. 29, 1966 |
| 3,458,964 to Guilliams | Aug. 5, 1969 |
| 3,493,204 to Prouty | Feb. 3, 1970 |
| 3,554,474 to Davies | Jan. 12, 1971 |
| 3,767,149 to Hill | Oct. 23, 1973 |
| 3,848,639 to Chen | Nov. 19, 1974 | all show supports for various kinds of pipe lines.

The Dressler and Thayer patents both describe the turbulence, currents, stresses and strains encountered in systems designed specifically for the aeration of wastewater. Certain of these strains result from the floatation effect of the aeration pipes that must remain submerged adjacent the bottom of the aeration basin and other strains are produced by hydraulic flow in the fluid mass surrounding the aeration pipes and the dead weight loading of the piping and diffuser assemblies. Also it is important that an even distribution of air through a plurality of outlets be released adjacent the bottom of the basin to produce and maintain a desired hydraulic flow pattern within the fluid being aerated to achieve the necessary aerobic action for treating the wastewater mass, which demands the installation of a nearly perfect horizontal distribution of the several aeration domes.

The Dressler and Thayer teachings describe the use of fixed vertical supports under their respective pipes that may be adjusted for leveling the pipes that are held in rigid horizontal positions once the installation of aeration pipe system is completed. These supports are shown to be vertical legs forming rigid supports although they may be adjusted lengthwise to vary the horizontal position of the aeration pipes to which they are fixed.

DISCLOSURE OF THE INVENTION

The saddle structure of this disclosure is designed to be made of very inexpensively produced stampings made from flat strip stock of a corrosion resistant material such as, for example, stainless steel, galvanized iron and the like, including reinforced plastic. The saddles are particularly fabricated to be adjustable to vary the vertical height of the gas carrying pipes which they are designed to support so that the gas (e.g. air) diffusers may all be positioned in a common horizontal plane. Also, the saddles are resilient to a certain extent to accomodate the stresses produced in the piping system by the turbulent conditions noted above in a manner to minimize the strains within the horizontal runs of the pipes supported by the saddles.

The saddles take the form of an inverted V with a pipe engaging support at the intersecting legs of the V and the free ends of the legs each having an integral foot element adapted to be fixed to the floor of the liquid treatment system within which the several gas diffusion headers are supported. Suitable pipe engaging securing means are supported at the intersecting ends of the legs of the V shaped support and the vertical height of the headers may be adjusted by spreading the legs more or less as the supports are being fixed to the floor of the basin.

The corrosion resistant material from which the securing means and the supports are made is selected to resist the corrosive effects of the chemicals in the mass of fluid which surrounds the pipes and their supports at all times. Further, the shape of the saddle support means provides a desired degree of resilience while fully supporting the pipes so that the hydraulic turbulence normally present is dissipated without injury to the pipes or their supports. The supports are designed to contain the buoyant loading of the gas filled pipes that is somewhat counteracted by the dead weight loading of the pipes themselves on the supports as well as the hydraulic surges that produce vibrations within the otherwise somewhat rigid system.

The remainder of this disclosure discusses the invention in terms of an aeration system for a waste water treatment plant; this is not to be construed as a limitation because the present invention also finds utility in other liquid treatment systems such as the ozonation of potable water, the carbonation of liquids, fermentation processes, and the like.

DESCRIPTION OF THE PREFERRED EMBODIMENT

Figure 1:
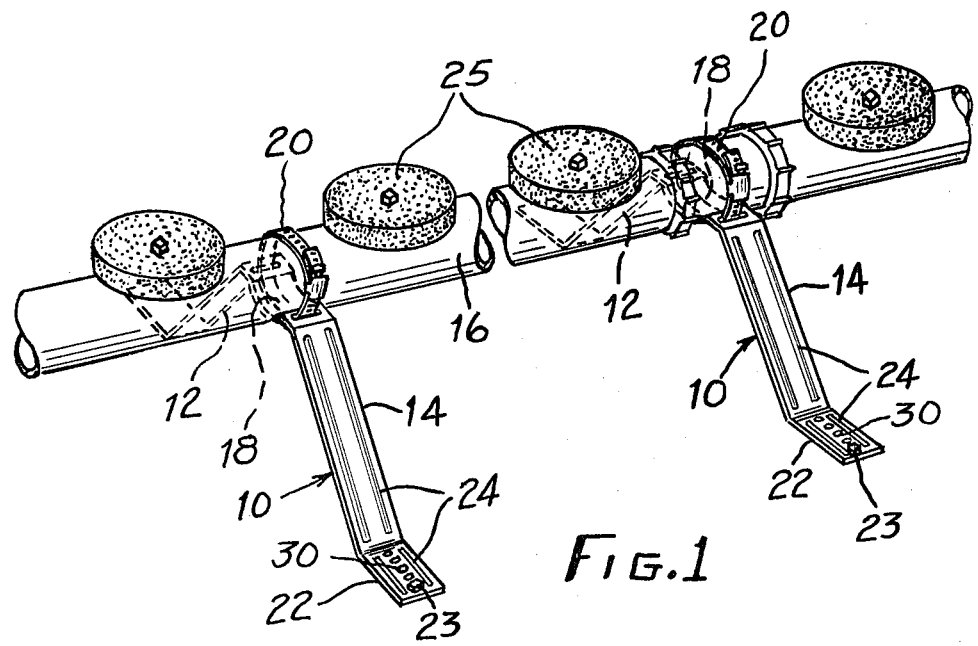
FIG. 1 is a perspective of an aeration pipe supported by several carriers of this invention.
Figure 2:
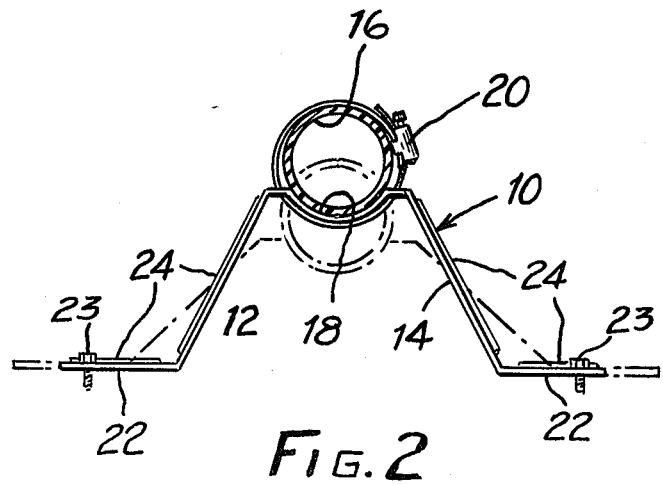
FIG. 2 is a sectional end view of the pipe in its support saddle.

Several of the supports 10, a number of which are distributed along each individual aeration pipe, are shown in FIG. 1. Each support takes the form of a generally inverted V shaped means having legs 12 and 14 that would, if the legs were extended, intersect at about the longitudinal axis of the aeration pipe 16 to which the support is attached. At the intersecting end of the V shaped saddle, the legs are integrally connected with a sling portion 18 that closely fits the external diameter of pipe 16. As seen best in FIG. 2, the pipe is adapted to nestle in the sling portion 18 and is secured in this seat by means of the clamp 20 which preferably takes the form of a worm gear clamp, or suitable strap. The legs of the saddle each extend outwardly generally at right angles to the longitudinal axis of the pipe and the free ends of each of the legs has an integral apertured foot means 22 that is adapted to be fixed to the floor of the aeration basin with bolts 23 or other anchor means. As is well known, a plurality of pipes are positioned over the floor of the basin and usually each aeration pipe 16 has a length to extend only over a portion of the floor. Several pipes are joined to extend over the entire length of the floor of the basin into which the mass of fluid wastewater is pumped. The plurality of pipes are usually disposed in a parallel relationship over the floor so that a uniform and constant flow of air bubbles can be produced throughout the entire mass as air is pumped through the pipe the air escaping from the diffusers 25 supported above suitable apertures in pipe 16.

The saddle support and pipe securing means of this invention are preferably made of stainless steel to be substantially inert to the corrosive chemicals usually present in the wastewater bath in which this support means is situated. The stamped legs and sling portion 18 of the V shaped support, with the legs 12 and 14 extending laterally outwardly from the aeration pipes, provide a substantial but somewhat resilient support for the pipes 16 to accomodate the vibration, lateral, bouyant, and other stresses produced by the several factors producing hydraulic turbulence within the fluid mass. These elements of the saddle support can be selectively stiffened as needed to minimize the possibility of undue flexure, by producing ribs 24 in the legs, sling portion 18 and foot elements 22.

In use, each of the pipes 16 with a plurality of these saddle support means assembled together along the length of each row of the pipes, are placed loosely in position on the floor of the basin of the aeration chamber. It is essential that the plurality of diffusers 25 be positioned in a common horizontal plane in order to produce the desired uniform aeration effect throughout the mass of the fluid to be treated. After the essential piping connections have all been made, the several saddles 10 can then be permanently fixed to the floor of the basin. Each diffuser is adjusted to its proper position horizontally by spreading the legs more or less of each of the several saddles supporting each of the pipes. The foot means 22 may then be permanently attached to the floor of the basin and for this purpose foot 22 may be provided with a plurality of apertures 30 if needed to permit more or less spreading of legs 12 and 14 to properly support the pipe 16 in its desired horizontal positions.

While a worm gear clamp has been shown in the preferred form of the invention, any suitable clamping means such as SS straping may be used to secure pipe 16 securely in each of the sling portions 18. Such other clamp should be made of a material inert to the fluid wastewater mass.

The specification above describes the preferred form of this invention. It is possible that modifications thereof may occur to those skilled in the art that will fall within the scope of the following claims.

What is claimed is:

1. Saddle support means to be attached to the floor of a liquid treatment system for carrying a plurality of gas distributing pipes together with their gas diffusers used in said liquid treatment system, each of said saddle means comprising a flexible inverted V shaped support means having corrosion resistant legs, a corrosion resistant sling support at the intersection of the legs of the V for securely engaging the pipe to the support, a corrosion resistant clamp means for securing the pipe to the sling of the support means, the free ends of the legs of said V support each having an integral foot means including plural spaced mounting holes for engaging the floor of said liquid treatment system, and corrosion resistant means engaging said foot means for permanently engaging the respective feet of said legs in adjusted position on said floor whereby a plurality of said saddle support means may be fitted to each of the pipes and adjustably secured to the floor so that all of the diffusers on said plurality of pipes in said liquid treatment system can be adjusted to a desired horizontal plane.

2. Saddle support means as in claim 1 wherein said V shaped support is a stamped one piece element having stiffening ribs formed on said sling, legs and integral foot means.

3. Saddle support means as in claim 1 wherein said pipes extend longitudinally along their respective axes in said liquid treatment system and said supports at the intersection of the legs of the Vs for engaging the respective pipes holding said legs of the Vs are disposed in planes that are positioned at right angles to said longitudinal axes of said pipe.

4. A saddle support means as in claim 3 wherein said legs are somewhat resilient whereby a shock absorbing support is provided for said gas distributing pipes, and said support means is made of stainless steel.

* * * * *